Feb. 13, 1962 R. W. BEALL, JR 3,020,623
BATTERY CABLE MAKE-UP TOOL
Filed July 2, 1956 2 Sheets-Sheet 1
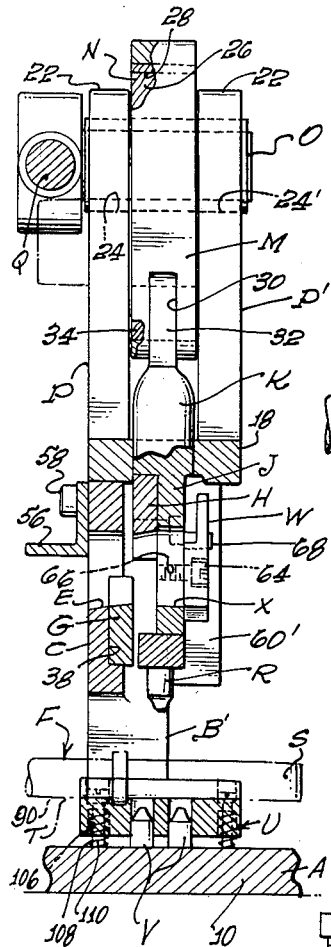
Richard W. Beall, Jr.,
INVENTOR.
BY William C. Babcock
ATTORNEY.

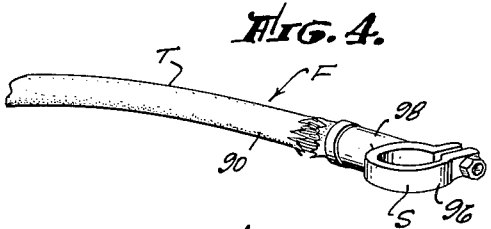
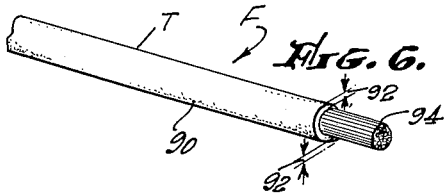
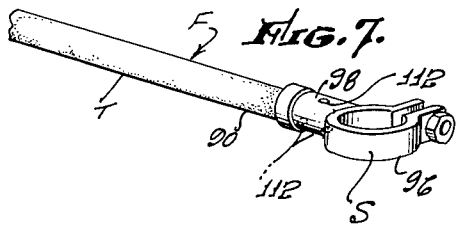
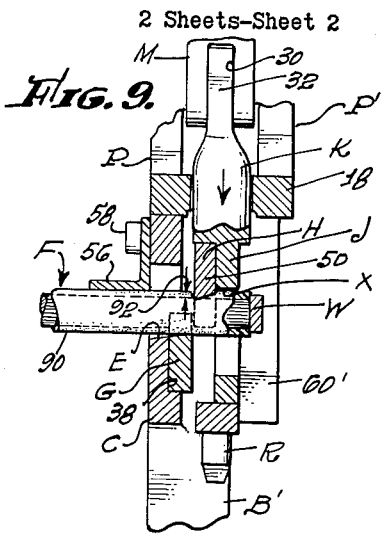
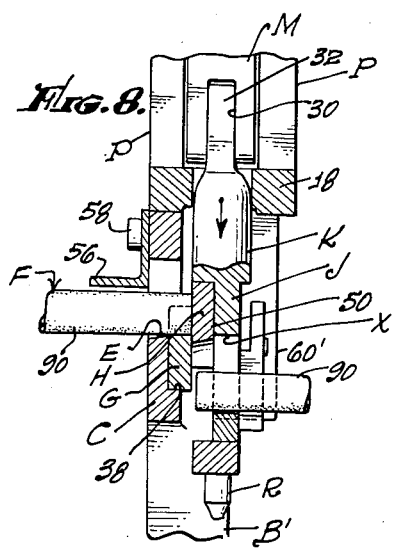
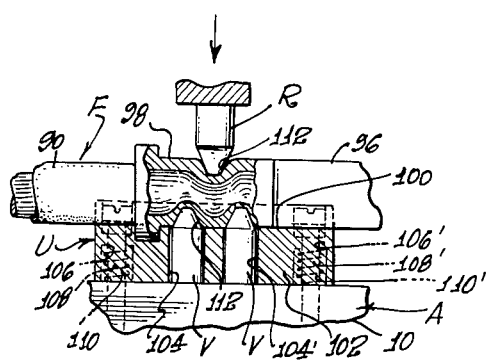
RICHARD W. BEALL, JR.,
INVENTOR.
BY
William C. Babcock
ATTORNEY.

United States Patent Office 3,020,623
Patented Feb. 13, 1962

3,020,623
BATTERY CABLE MAKE-UP TOOL
Richard W. Beall, Jr., 834 20th St., Hermosa Beach, Calif., assignor of one-half to Linden H. Chandler, Lomita, Calif.
Filed July 2, 1956, Ser. No. 595,174
10 Claims. (Cl. 29—33.5)

The present invention relates generally to the field of automotive service station equipment, and more particularly to a device adapted for cutting battery cable, ignition cable or wire, or other insulated electrical conductors to a desired length, stripping the end portions of insulation therefrom, and crimping battery clamps or terminal connectors to the bared end portions thereof.

A major object of the present invention is to provide a portable, manually operable device that permits electrical conducting cables of the desired length to be made up in a relatively short time, and eliminates the necessity for a service station or other location in which such work is done to maintain a large stock of made-up electrical conducting cables of various lengths as now required in order to properly service the different types and styles of automotive and other power equipment.

Another object of the invention is to provide a device by means of which the cable to be made up is unwound from a coil or spool thereof in a service station or other desired location, cut to the appropriate length for the particular automobile or truck to be serviced, and the insulation removed from the end portions of the cut cable whereby terminal clamps may be crimped to the bared wire ends thereof.

A still further object of the present invention is to provide a cable handling device that is compact, can be fabricated from standard, commercially available materials, and due to its simplicity of design, requires a minimum of maintenance attention.

Yet another object of the invention is to supply a device that is extremely simple and easy to operate, and one that can be used in making up an automotive battery cable with clamps by those having limited mechanical skill.

A further object of the invention is to provide a device that may be utilized either when making up a new battery cable with battery clamps affixed thereto, or in the reclamation of old battery cable by replacing defective or worn out clamps with new.

Yet another object of the invention is to provide a device that will tend to increase the sale of battery cables, as a suitable connection can be made up in a relatively short time for a particular automotive vehicle, irrespective of the length of cable required for that particular installation.

These and other objects and advantages of the invention will become apparent from the following description of a preferred form thereof when taken in conjunction with the accompanying drawing illustrating that form, in which:

FIGURE 1 is a side elevational view of the invention shown after the actuating handle has been moved to a position for crimping the clamp to the cable.

FIGURE 2 is an enlarged front elevational view of the invention showing the actuating handle in a position opposite to that shown in FIGURE 1, ready to accept a battery cable for cutting same;

FIGURE 3 is a vertical cross-sectional view of the device taken on line 3—3 of FIGURE 2;

FIGURE 4 is a perspective view of a cable showing the manner in which same may be cut and a new clamp affixed thereto;

FIGURE 5 is a perspective view of a cable after being cut by use of the invention;

FIGURE 6 is a perspective view of the cut cable illustrated in FIGURE 5, showing an end portion of the insulating material stripped therefrom;

FIGURE 7 is a perspective view of the stripped cable on which a battery clamp is crimped to the bare end portions thereof;

FIGURE 8 is a fragmentary vertical cross-sectional view of the invention showing the manner in which the cutters sever the cable;

FIGURE 9 is a fragmentary vertical cross-sectional view of the cutter showing the manner in which they are used to strip insulation from the end portion of a cable; and FIGURE 10 is a fragmentary vertical cross-sectional view of the punches forming a part of the invention showing the use of same in crimping a clamp to a cable.

Referring to the drawing for the general arrangement of the invention, it will be seen to include a base A on which two stanchions B and B' are mounted that support a cross piece C therebetween. Two laterally separated openings D and E are formed on cross piece C, and the diameter of opening D is sufficient to permit insertion of ignition wire therein, with opening E being sufficiently large to accommodate an electrically insulated battery cable F. A first cutter bar G is mounted on the interior face of cross piece C adjacent openings D and E.

A second cutter bar H is disposed adjacent bar G and affixed to a rigid guide plate J that may be moved upwardly and downwardly by movement of a vertically disposed rod K. Rod K is pivotally connected to a member M which rotatably engages an eccentric N that is rigidly affixed to and mounted on a shaft O, which shaft is rotatably supported by two laterally spaced upright members P and P' that are mounted above the stanchions B and B'. Rotation of shaft O is accomplished by use of an elongate handle Q rigidly affixed thereto, as shown in FIGURES 1, 2 and 3. The lower portion of guide plate J supports a punch R that is adapted to crimp a portion of a battery clamp S to the bared end portion of a cable T when the punch R is brought into contact with the clamp and cable after they are removably disposed in a spring-loaded cradle U (FIGURE 3). When supporting the clamp S and end portion of cable T, cradle U is adapted to be moved downwardly by punch R to a position where two second punches V are brought into contact with the under side thereof, to facilitate the crimping of the clamp to the cable.

It will be noted (FIGURES 1, 2 and 3) that the guide plate J pivotally supports a first stop W that may be so positioned as to close openings X formed in the plate through which portions of cable T extend during cutting of the cable. With the stop W pivoted to the position shown in FIGURE 1, the end of cable T abuts against the interior face thereof, and electrical insulation may be stripped therefrom whereby an end portion of the cable is exposed as shown in FIGURE 6. To prevent severance of the cable by the cutting bars G and H, a second stop Y is provided (FIGURES 1 and 3) that may be pivoted to a position that will limit the downward movement of the guide plate J. By use of the second stop Y, guide plate J can only move downwardly to that point where the cutting bars G and H can sever the sheath of electrical insulating material surrounding the metallic core of the cable T, and only to the degree that this sheath of cut insulation may be slipped off the end portion of the cable to expose the metallic core of the end portion. Second stop Y is normally disposed in the position shown in FIGURES 1 and 2 and is only positioned under the guide plate J when the electrical insulating material is being removed from cable T.

In detail, the structure of the invention may best be seen in FIGURES 2 and 3. Base A is preferably rectangular in shape and formed of a heavy metallic member 10, which can be bolted or otherwise secured to the top surface of a table, bench, or other supporting structure, by a bolt 12 or the like. The two stanchions B and B' are of rectangular horizontal cross-section, connected by the cross piece C which is likewise rectangular, and preferably formed as an integral part of the two stanchions. Tapped openings 14 and 14' are formed in the upper portions of stanchions B and B' respectively, that are engaged by bolts or screws 16 and 16' which extend downwardly through bores 19 and 19' formed in the end portions of a heavy cross member 18 that rests on the upper faces of stanchions B and B'. Member 18 has a vertically extending bore formed in substantially the center thereof. The substantially triangular supports P and P' are welded or otherwise affixed to the upper surface of cross member 18 and project upwardly to terminate in blunt, curved apex portions 22, as shown in FIGURE 1. Bores 24 and 24' are formed in supports P and P' respectively, which bores rotatably support the shaft O (FIGURE 2). If desired, ball bearing assemblies (not shown) may be mounted in supports P and P' for the rotatable support of shaft O. A circular plate 26 is eccentrically mounted on shaft O between the two supports P and P', which plate is rotatably mounted in a bore 28 formed in the member M. One end portion of shaft O projects beyond one of the supports, and the handle Q, which is of conventional construction, is rigidly affixed thereto. An upwardly extending slot 30 is provided in the lower end portion of member M in which a flat end portion 32 of the rod K is movably disposed. The lower end portion of member M, as well as the flat upper end portion 32 of rod K, have aligned bores formed therein that are engaged by a pin 34 to movably connect member M and rod K, for reasons that will hereinafter become apparent.

Openings D and E in cross piece C are generally oval in shape. A recess 38 that is adapted to receive the lower portion of the cutter bar G is provided on the interior face of cross piece C. Two semi-circular recesses 40 and 42 that have upwardly and inwardly tapering faces 40a and 42a respectively, are formed in cutter bar G, which faces terminate in interiorly disposed cutting edges 40b and 42b, respectively. Cutting member G is rigidly affixed to cross piece C by welding, bolts, screws, or other conventional fastening means.

Openings X and X' in guide plate J are vertically aligned with openings D and E in cross piece C. The second cutter bar H is rigidly affixed to the interior upper face of the guide plate J and has two semi-circular recessed cutters 48 and 50 formed therein that cooperate with cutters 40 and 42, respectively. Cutters 48 and 50 are defined by two flat downwardly and inwardly extending semi-circular faces 48a and 50a that terminate on cutter edges 48b and 50b, respectively. When a cable T is extended through either of the openings D or E, as well as the openings X and X' associated therewith, and the handle Q is rotated from the position in FIGURE 2 to that shown in FIGURE 1, the eccentric 26 is rotated relative to the member M to force the rod K downwardly sufficiently to cause the cutter bar H to move downwardly relative to cutter bar G whereby the cutter edges 40b and 48b, or cutter edges 42b and 50b cooperatively sever the cable with which they come into contact as the above-mentioned movement of handle Q occurs. When cable T is being cut, that portion of the cable extending outwardly from the side of the device below the handle Q tends to pivot upwardly, which upward movement is prevented by means of an angular rigid member 56 that is preferably affixed to the exterior surface of cross piece C by bolts or screws 58 (FIGURE 3).

During cutting of the cable T as above mentioned, the stop W occupies the position shown in FIGURE 2, and the stop Y likewise remains in the position shown in the same figure. Two identical plates 60 and 60' are affixed by bolts 62 and 62' to the upper exterior surface portions of stanchions B and B', which plates extend inwardly to slidably engage the end portions of plate J to prevent lateral movement thereof when the plate is moved upwardly or downwardly by actuation of handle Q. Stop W is preferably a rectangular plate formed of a rigid material, and is pivotally mounted on a screw 64 that engages a tapped bore 66 formed in guide plate J.

A protuberance 68 is so disposed on the exterior face of guide plate J as to support stop W in the upwardly extending position shown in FIGURE 2 when the stop is not in use. However, when it is desired to strip insulation from an end portion of cable T, the stop W is pivoted in a direction counter to that shown in FIGURE 2 until the stop is substantially horizontally disposed, a position which the stop automatically assumes when one end portion thereof engages the under portion of protuberance 68 (FIGURE 1).

Stop Y includes a rigid member 70 that is mounted on the upper surface of base A by a screw 72 which extends downwardly through a bore 74 formed in the member to engage a tapped bore 76 provided in the base A. On the outer end thereof, member 70 supports a rigid upright 78 in which a tapped, vertically extending bore 80 is formed in which a screw 82 is threadedly mounted. A lock nut 84 is provided for screw 82 to hold the head 86 of screw 82 at the desired vertical elevation where head 86 will be engaged by the under side 88 of guide plate J after it has been lowered a predetermined distance by use of handle Q.

When it is desired to use the invention for stripping a layer of electrical insulating material 90 from a cable (FIGURE 4), the stop W is pivoted to the position shown in FIGURE 1 and stop Y is likewise pivoted from the position shown in solid line in FIGURE 2 to that shown in phantom line in the same figure. Cable T, depending on the diameter thereof, may then be inserted through either of the openings D or E, with the end of the cable abutting against the interior face of stop W. Handle Q is now moved from the position shown in FIGURE 2 toward that shown in FIGURE 1, but before the latter position is reached, downward movement of the guide plate J is interrupted when the lower edge 88 thereof engages the upper surface of the screw head 86 of stop Y. If the screw 82 is adjusted correctly in upright 78, the screw will so limit the downward movement of cutter bar H that the cutter edges 40b and 48b or 42b and 50b will move inwardly through the insulating material 90 a distance 92, as shown in FIGURE 6, whereby the insulation 90 is completely severed, and the severed portion may then be slipped from the cable, exposing end portion 94 thereof to which the clamp S may be affixed. Cable T may then be withdrawn from the invention, the severed insulation removed therefrom, and the stop W returned to the position shown in FIGURE 1, and the stop Y pivoted from the position shown in phantom line in FIGURE 2 to that shown in solid line.

Clamp S, as can be seen in FIGURE 7, is of a type that includes a battery terminal post engaging member 96 having a hollow shank 98 extending outwardly therefrom that is formed of lead or other deformable material. After the insulation has been stripped from an end portion of cable T (FIGURE 6), the shank 98 is slipped over the exposed end 94 and both the shank and engaged cable end are placed in an elongated semi-circular recess 100 formed in the cradle U. Cradle U is formed of a rectangular block of rigid material 102 in which recess 100 is formed, and two longitudinally spaced, vertically extending bores 104 and 104' are provided in block 102, which bores are slidably engaged by the two spaced punches V that project upwardly from base A. The block 102 also has two longitudinally spaced, elongate cavities 106 and 106' that extend upwardly on opposite ends from the lower face thereof. Two pins 108 and 108' which are considerably shorter than cavities 106 and 106' project upwardly therein, which pins have two helical springs 110 and 110' mounted thereon. The upper ends of springs 110 and 110' rest on the upper end portions of the cavities 106 and 106' and support the cradle U at an elevated position above the upper surface of base A. In this position the two punches V do not contact the under surface of shank 98. After the shank has been placed in cradle U the handle Q is rotated from the position shown in FIGURE 2 to that shown in FIGURE 1, whereby the punch R is moved downwardly to contact the upper surface of the shank, forcing it and the cradle U downwardly to bring the lower portion of the shank into contact with the upper end portions of punches V, and portions of the shank are deformed inwardly to form three dimples 112 as shown in FIGURE 7, which dimpled portions tightly engage the bared end portions 94 of cable T. Handle Q is then pivoted from the position shown in FIGURE 1 to that shown in FIGURE 2, and the clamp affixed thereto, the cable removed from the device.

The eccentric N is so mounted on shaft O that during the movement of handle Q from the position shown in FIGURE 2 to that shown in FIGURE 1 the punch R is moved downwardly. However, after handle Q reaches the position shown in FIGURE 1, further rotation of the handle in a clockwise direction causes the punch R to move upwardly. By this means the depths of the dimples 112 is controlled, and to the extent that the metal forming the shank 98 will not be punctured by the punches R and V.

The operation of the invention has been described in detail and need not be repeated herein.

Although the form of the invention herein shown and described is fully capable of achieving the objects and providing the advantages hereinbefore mentioned, it is to be understood that it is merely illustrative of the presently preferred embodiment thereof and that I do not mean to limit myself to the details of construction herein shown and described other than as defined in the appended claims.

I claim:

1. A device for use in cutting a length of cable covered with electrical insulating material from a coil thereof, removing said insulation from the end portions of said cable, and crimping terminal connectors having elongated tubular shanks to said exposed cable end portions, including: first cutting means; second cutting means so operatively associated with said first means that when said second means is moved a first distance relative to said first means said cable disposed between said first and second means is cut, which second means when moved a second distance relative to said first means severs said insulating cover on said cable, said first and second cutting means being first and second parallel bars, each of which have at least one semi-circular recess formed therein that is oppositely disposed and aligned with said recess formed in the other of said bars; first punch means that move concurrently with said second cutting means; second punch means that are stationary and in substantially the same vertical plane as said first punch means; a first stop operatively associated with said second cutting means to hold said cable in a position to permit cutting of a predetermined length of said insulating material from an end portion thereof; a second stop operatively associated with said second cutting means that limits the movement thereof to said second distance; and actuating means for concurrently moving said second cutting means and first punch means to sequentially cut said cable, sever said insulating material on the end portions thereof, and crimp said connectors to said end portions by pressure contact between said punch means; a base being provided that has two stanchions mounted thereon between which a crosspiece extends, said first cutting bar being rigidly affixed to said crosspiece, a guide plate being provided that is vertically movable relative to said stanchions by said actuating means, and on which guide plate said second cutting bar is rigidly mounted, said first punch being rigidly connected to and supported from said guide plate.

2. A device as defined in claim 1 in which said guide plate is formed with one aligned opening for each of said recesses formed in said second cutting bar.

3. A device as defined in claim 2 in which said actuating means is a rotatable shaft on which a circular member is eccentrically mounted, which circular member rotatably engages a rigid member that is pivotally connected to a rod extending to said guide plate, said rod and guide plate being rigidly connected to one another.

4. A device as defined in claim 3 in which said rotatable shaft is provided with handle means for use in manually rotating same.

5. A device as defined in claim 4 in which said first stop means is an elongate plate pivotally supported on said guide plate, which plate when in a first position does not obstruct said openings in said guide plate, but when pivoted to a second position obstructs said openings in said guide plate to prevent end portions of said cable from extending therethrough when said insulating material is being severed from said end portions.

6. A device as defined in claim 5 in which said second stop means is a vertically adjustable structure pivotally supported on said base, which structure when in a first position does not interfere with movement of said guide plate, but when moved to a second position limits the downward movement of said guide plate to prevent said cable from being cut when said insulating material is being severed on the end portion thereof.

7. A device as defined in claim 5 in which a spring-loaded cradle is provided that is mounted for vertical movement on said base, which cradle is formed with openings wherein said second punch means are normally concealed, but when said cradle is supporting one of said clamps that engage an end portion of said cable it is adapted to be urged downwardly by downward movement of said first punch means to allow said first and second punch means to pressure contact said clamp and affix it to said cable.

8. A device as defined in claim 7 in which said cradle is spring-loaded to the extent that it at all times conceals said second punch means except when said clamp disposed therein is subjected to pressure contact from said first punch means.

9. A device as defined in claim 8 in which said cradle is formed with a semi-cylindrical recess in which the portions of said cable and clamp that are to be affixed to one another are disposed for pressure contact from said punches.

10. A device as defined in claim 8 in which said member is so eccentrically mounted that said first punch means starts to raise after having been lowered a predetermined distance by rotation of said handle, said raising operation limiting the depth of dimples formed in said terminal connectors by said punch means in the crimping of said connectors on said cable.

References Cited in the file of this patent

UNITED STATES PATENTS

| 765,825 | Felker | July 26, 1904 |
| 2,340,448 | Andren | Feb. 1, 1944 |
| 2,422,952 | Dakin | June 24, 1947 |
| 2,774,130 | Folkenroth | Dec. 18, 1956 |